UNITED STATES PATENT OFFICE.

STEWART J. SPENCE, OF HARRIMAN, TENNESSEE.

COMPOSITION OF MATERIALS FOR DENTISTS' OR OTHER USES.

SPECIFICATION forming part of Letters Patent No. 716,491, dated December 23, 1902.

Application filed September 5, 1902. Serial No. 122,214. (No specimens.)

*To all whom it may concern:*

Be it known that I, STEWART J SPENCE, a citizen of the United States, residing at Harriman, in the county of Roane and State of Tennessee, have invented a new and useful Composition of Materials for Dentists' or other Uses where a Hard and Non-Expansive Plaster is Desired for Making Molds and Taking Impressions, of which composition the following is a specification.

My composition consists of the following ingredients combined in proportions stated, viz: plaster-of-paris, ten and three-fourths ounces; Portland cement, three and three-fourths ounces; sand, one and one-half ounces; pulverized sulfate of alumina and potash, (being the officinal alum,) seventy grains; pulverized citric acid, six grains. These ingredients are to be thoroughly mixed while in the powder, then add water and stir one minute.

In using the above-named composition sufficient water should be applied to reduce the powder to a mortar consistency.

When used as above directed, this composition will harden in ten minutes.

By the use of the above materials the expansion of plaster-of-paris during the process of making artificial dental plates is entirely prevented, thereby producing better fitting dental plates.

This composition also possesses a quality of hardness over similar compositions or plaster-of-paris which renders it less liable to fracture from any cause or crush out of shape during the operation of compression, or forcing the plaster mold or form into the vulcanizable rubber, thereby securing a much more perfect fit of dental plates.

What I claim, and desire to secure by Letters Patent of the United States, is—

1. The herein-described composition of materials consisting of plaster-of-paris, Portland cement, sand, pulverized sulfate of alumina and potash, pulverized citric acid, and water, substantially as described, and for the purposes specified.

2. The herein-described composition of materials for making plaster casts or molds consisting of plaster-of-paris, ten and three-fourths ounces; Portland cement, three and three-fourths ounces; sand, one and one-half ounces; pulverized sulfate of alumina and potash, (being the officinal alum,) seventy grains; pulverized citric acid, six grains, substantially as described.

STEWART J. SPENCE.

Witnesses:
NELLIE BLANCHE HARSH,
G. H. DUTHIE.